(12) United States Patent
Kuo et al.

(10) Patent No.: US 11,965,540 B2
(45) Date of Patent: Apr. 23, 2024

(54) HAND TOOL FOR BOLTS FASTENING

(71) Applicant: National Kaohsiung University of Science and Technology, Kaohsiung (TW)

(72) Inventors: Chun-Chih Kuo, Kaohsiung (TW); Cheng-Yu Yang, Kaohsiung (TW)

(73) Assignee: NATIONAL KAOHSIUNG UNIVERSITY OF SCIENCE AND TECHNOLOGY, Kaohsiung (TW)

( * ) Notice: Subject to any disclaimer, the term of this patent is extended or adjusted under 35 U.S.C. 154(b) by 732 days.

(21) Appl. No.: 17/033,702

(22) Filed: Sep. 26, 2020

(65) Prior Publication Data
US 2021/0115963 A1    Apr. 22, 2021

(30) Foreign Application Priority Data
Oct. 18, 2019   (TW) ................................. 108137719

(51) Int. Cl.
| | | |
|---|---|---|
| B23Q 3/00 | (2006.01) | |
| B23Q 3/06 | (2006.01) | |
| B25B 11/02 | (2006.01) | |
| F16B 39/30 | (2006.01) | |

(52) U.S. Cl.
CPC .............. F16B 39/30 (2013.01); B23Q 3/064 (2013.01); B25B 11/02 (2013.01)

(58) Field of Classification Search
CPC .......... B23Q 3/00; B23Q 3/064; B23Q 3/005; B25B 5/00; B25B 27/00; B25B 27/023
See application file for complete search history.

(56) References Cited

U.S. PATENT DOCUMENTS

| | | | | |
|---|---|---|---|---|
| 3,898,714 A | * | 8/1975 | McFadden | B23K 37/0533 228/49.1 |
| 3,979,814 A | * | 9/1976 | Lajoie | F16L 1/10 29/272 |
| 6,988,696 B2 | * | 1/2006 | Attee | B25B 5/147 248/214 |
| 6,993,821 B2 | * | 2/2006 | Ahti | B25B 5/14 269/297 |
| 7,007,900 B2 | * | 3/2006 | Goodwin | H02G 7/053 248/74.1 |
| 8,657,272 B2 | * | 2/2014 | Gurule | B25B 5/14 269/43 |
| 2016/0010782 A1 | * | 1/2016 | Skinner | F16L 55/172 285/15 |
| 2021/0107072 A1 | * | 4/2021 | Miller | B25B 3/00 |
| 2021/0115963 A1 | * | 4/2021 | Kuo | F16B 39/30 |

* cited by examiner

Primary Examiner — Lee D Wilson
(74) Attorney, Agent, or Firm — WPAT, PC (57) ABSTRACT

A hand tool for bolts fastening includes a block-shaped jig body, a first bolt hole is disposed in the jig body laterally and a second bolt hole is disposed in the jig body longitudinally, an end of the second bolt hole is in communication with the first bolt hole, the second bolt hole allows a packing bolt to pass through and be screwed, a hemispherical suppression portion is disposed at an end of the packing bolt, the first bolt hole allows a to-be-fastened bolt to be screwed, the suppression portion of the packing bolt is pressed down on a selected position of the bolt, to cause a crest at the selected position to expand outward, so that interference occurs when the bolt is screwed with a bolt hole or a nut, to increase a torque force required to make the bolt come off.

5 Claims, 9 Drawing Sheets

FIG. 1

Prior art

HAND TOOL FOR BOLTS FASTENING

BACKGROUND

Technical Field

The present invention relates to fastened bolts, and in particular, to a hand tool that is easy to operate and can be used for processing an ordinary bolt into a fastened bolt at any time.

Related Art

Figure 1:
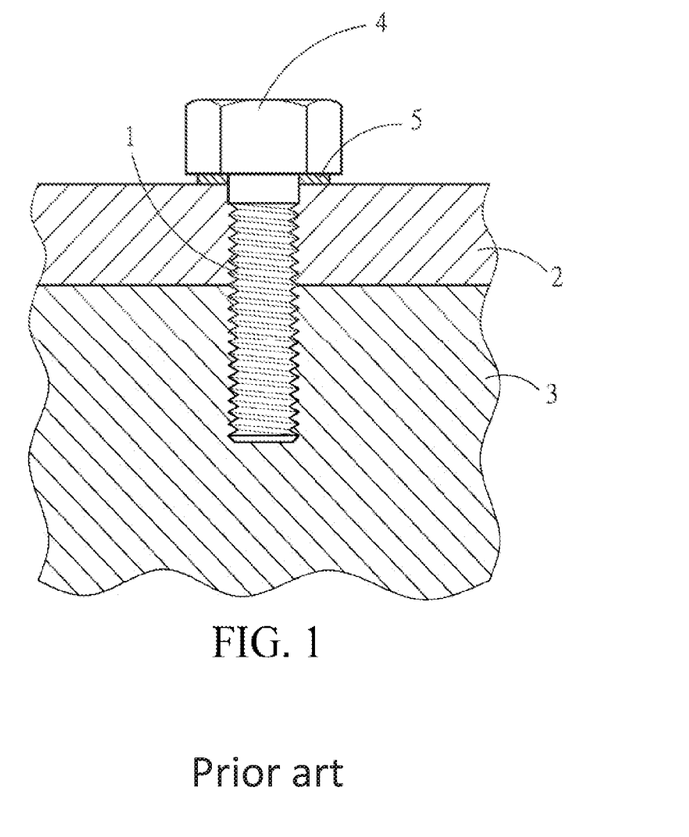
FIG. 1 is a schematic plan view of two conventional components screwed together.

Referring to FIG. 1, an ordinary bolt 1 is mainly used for screwing two components 2 and 3 tightly together. When the bolt 1 is used in a place where there is a lot of vibration, the bolt 1 loosens or withdraws over time, causing the originally tightly connected two components 2 and 3 to loosen from each other. Alternatively, use of the bolt 1 in a mechanism expanding with heat and contracting with cold can also cause the bolt 1 to loosen. To prevent the bolt 1 from loosening, a common method is to place an elastic washer 5 at a position of the bolt close to a bolt head 4. However, as the components or the mechanism continue to vibrate, it is still difficult to prevent the bolt 1 from loosening. Once the bolt 1 loosens on the mechanism, either device damage or a major accident is caused. On the market today, most of the common fastened bolts are mass produced, with limited specifications and applications.

SUMMARY

In view of this, a main objective of the present invention is to provide a hand tool that can be used for processing an ordinary bolt into a fastened bolt at any time, to cause a crest at a selected position of a bolt to expand outward, so that interference occurs when the bolt is screwed with a bolt hole or a nut, to increase a torque force required to make the bolt come off, thereby improving a locking force, and achieving fast, convenient, and economic performance.

To achieve the foregoing objective, the present invention discloses a hand tool for bolts fastening, including a jig body, where a first bolt hole is disposed in the jig body laterally and a second bolt hole is disposed in the jig body longitudinally, an end of the second bolt hole is in communication with the first bolt hole, the second bolt hole allows a packing bolt to pass through and be screwed, a suppression portion is disposed at an end of the packing bolt, the first bolt hole allows a to-be-fastened bolt to be screwed, the suppression portion of the packing bolt is pressed down on a selected position of the bolt, to cause a crest at the selected position to expand outward, so that interference occurs when the bolt is screwed with a bolt hole or a nut, to improve a locking force.

The jig body is block-shaped and includes a front side face and a rear side face, the first bolt hole runs through the front side face and the rear side face, the second bolt hole runs through the jig body from a top face of the jig body downward to the first bolt hole, and the suppression portion of the packing bolt is hemispherical.

A through hole in a same direction as the first bolt hole, and a first cutting slot in a same direction as the top face and a bottom face and running through the front side face and the rear side face are further included, where the first cutting slot runs through the first bolt hole so that the through hole is in communication with the first bolt hole, and the first cutting slot extends to a lateral side of the first bolt hole away from the through hole.

The through hole is circular, and the through hole runs through the front side face and the rear side face, a hole diameter of the through hole is greater than that of the first bolt hole, an extending portion extends outward from a side of the jig body away from the through hole, the extending portion is disposed with a second cutting slot running through the front side face and the rear side face, the second cutting slot extends to the first cutting slot and meets the first cutting slot, an upper-and-lower width of the first cutting slot is greater than that of the second cutting slot, the second cutting slot defines an upper clamping portion and a lower clamping portion disconnected up and down by the extending portion, the upper clamping portion and the lower clamping portion are disposed with a penetrating hole penetrating longitudinally, and a first bolt is screwed with a nut after the first bolt is inserted into the upper clamping portion and the lower clamping portion.

An upper-and-lower thickness of the extending portion is less than that of the jig body.

The jig body is a rectangular block and has the front side face and the rear side face in a front direction and a rear direction respectively, the jig body has the top face and a bottom face in an upper direction and a lower direction respectively, the jig body include a first side face and a second side face on a left side and a right side respectively, the through hole is close to the first side face, the extending portion extends from the second side face, and the first cutting slot extends to a position close to the second side face.

A hole diameter size of the first bolt hole and a size of the suppression portion of the packing bolt can be changed to apply to various bolts with different specifications.

In this way, the crest at the selected position of the bolt is caused to expand outward, so that interference occurs when the bolt is screwed with a bolt hole or a nut, to improve a locking force, and increase a torque force required to make the bolt come off, thereby preventing the bolt from loosening or withdrawing when the bolt is used in a mechanism having vibration or expanding with heat and contracting with cold.

The present invention has at least the following advantages:

1. Crests may be processed to expand outward according to various bolts in the present invention, and a locking bolt can be quickly manufactured, thereby having advantages of being fast, convenient, and easy to use.
2. The present invention is simple in structure, and easy and fast to process and operate, so that costs can be greatly reduced, having the advantage of being easy to obtain.
3. The present invention is small in size, occupies little space, and is convenient to carry, making it easy to be used everywhere, thereby achieving a high price-quality ratio.

DETAILED DESCRIPTION

Detailed contents and technical descriptions of the present invention are further described by using embodiments. However, it should be understood that the embodiments are only used as examples for description, and should not be construed as limitations of implementation of the present invention.

Figure 2:
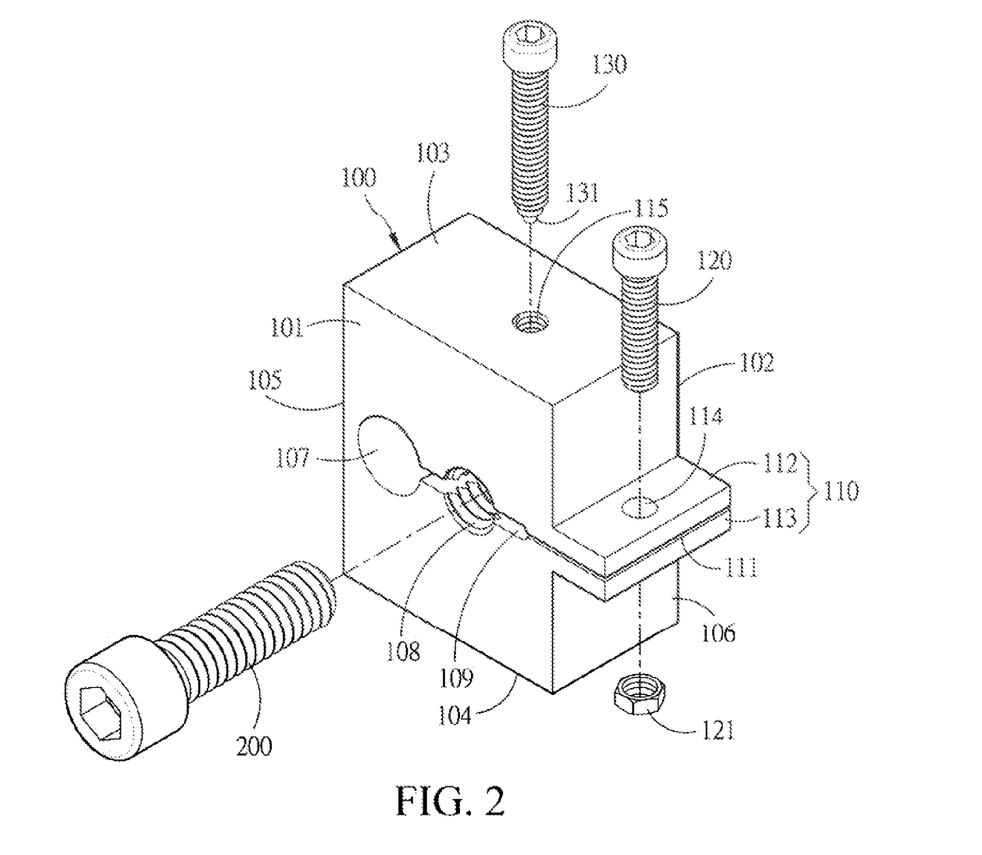
FIG. 2 is an exploded three-dimensional view according to an embodiment of the present invention.
Figure 3:
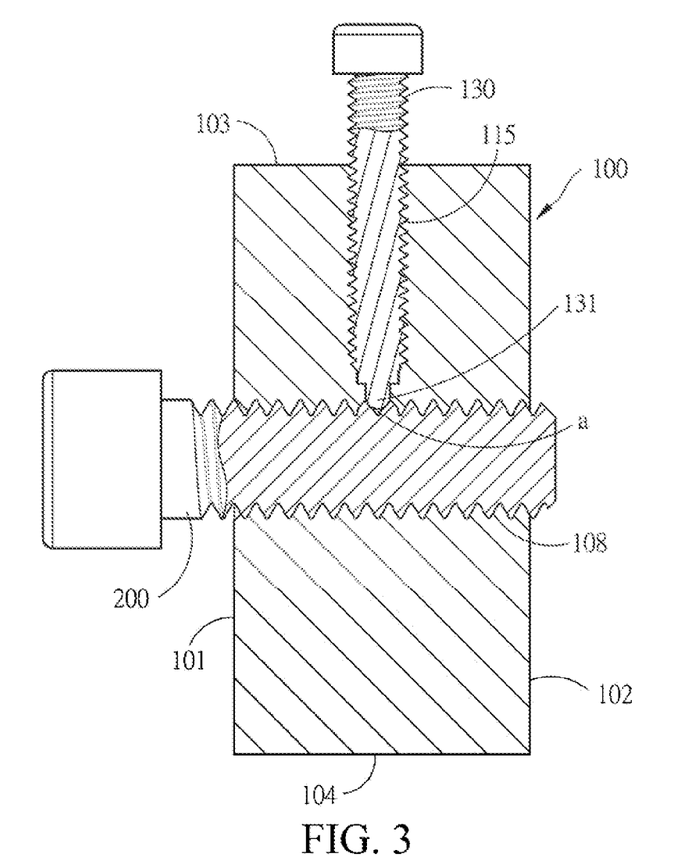
FIG. 3 is a cross-sectional view according to an embodiment of the present invention.

Referring to FIG. 2 and FIG. 3, the present invention discloses a hand tool for bolts fastening, including a jig body 100. The jig body 100 is block-shaped, a through hole 107 and a first bolt hole 108 are disposed in the jig body 100 laterally, and a second bolt hole 115 is disposed in the jig body 100 longitudinally. An end of the second bolt hole 115 runs through the first bolt hole 108. The second bolt hole 115 allows a packing bolt 130 to pass through and be screwed. A hemispherical suppression portion 131 is disposed at an end of the packing bolt 130. The first bolt hole 108 allows a workpiece of a to-be-fastened bolt 200 to be screwed. The suppression portion 131 of the packing bolt 130 is pressed down on a selected position a of the bolt 200, to cause a crest at the selected position a to expand outward, so that interference occurs when the bolt is screwed with a bolt hole or a nut, to improve a locking force.

In this embodiment, the jig body 100 is a rectangular block, but is not limited to the rectangular block. The jig body 100 has a front side face 101 and a rear side face 102 in a front direction and a rear direction respectively. The jig body 100 has a top face 103 and a bottom face 104 in an upper direction and a lower direction respectively. The jig body 100 has a first side face 105 and a second side face 106 on a left side and a right side respectively. The through hole 107 is close to the first side face 105 and is circular. The first bolt hole 108 is disposed in a direction of the through hole 107 away from the first side face 105. A hole diameter of the through hole 107 is greater than that of the first bolt hole 108. A first cutting slot 109 is in a same direction as the top face 103 and the bottom face 104 and runs through the front side face 101 and the rear side face 102. The first cutting slot 109 passes through the first bolt hole 108 and extends to the through hole 107 so that the through hole 107 is in communication with the first bolt hole 108. The first cutting slot 109 extends to a lateral side of the first bolt hole 108 away from the through hole 107, that is, a position close to the second side face 106.

Further, an extending portion 110 extends outward from the second side face 106 of the jig body 100. An upper-and-lower thickness of the extending portion 110 is less than that of the jig body 100, and the extending portion 110 is disposed with a second cutting slot 111 parallel to the top face 103 and the bottom face 104 and running through the front side face 101 and the rear side face 102. The second cutting slot 111 extends from the extending portion 110 to the first cutting slot 109 and meets the first cutting slot 109. The second cutting slot 111 defines an upper clamping portion 112 and a lower clamping portion 113 disconnected up and down by the extending portion 110. The upper clamping portion 112 and the lower clamping portion 113 are disposed with a penetrating hole 114 penetrating longitudinally. An upper-and-lower width of the first cutting slot 109 is greater than that of the second cutting slot 111. A first bolt 120 running through the penetrating hole 114 from top to bottom is screwed with a nut 121 after the first bolt 120 is inserted into the upper clamping portion 112 and the lower clamping portion 113.

The second bolt hole 115 runs through the jig body 100 from the top face 103 of the jig body 100 downward the first bolt hole 108. The second bolt hole 115 allows the packing bolt 130 to pass through and be screwed. The end of the packing bolt 130 is disposed with the hemispherical suppression portion 131.

Figure 4A:
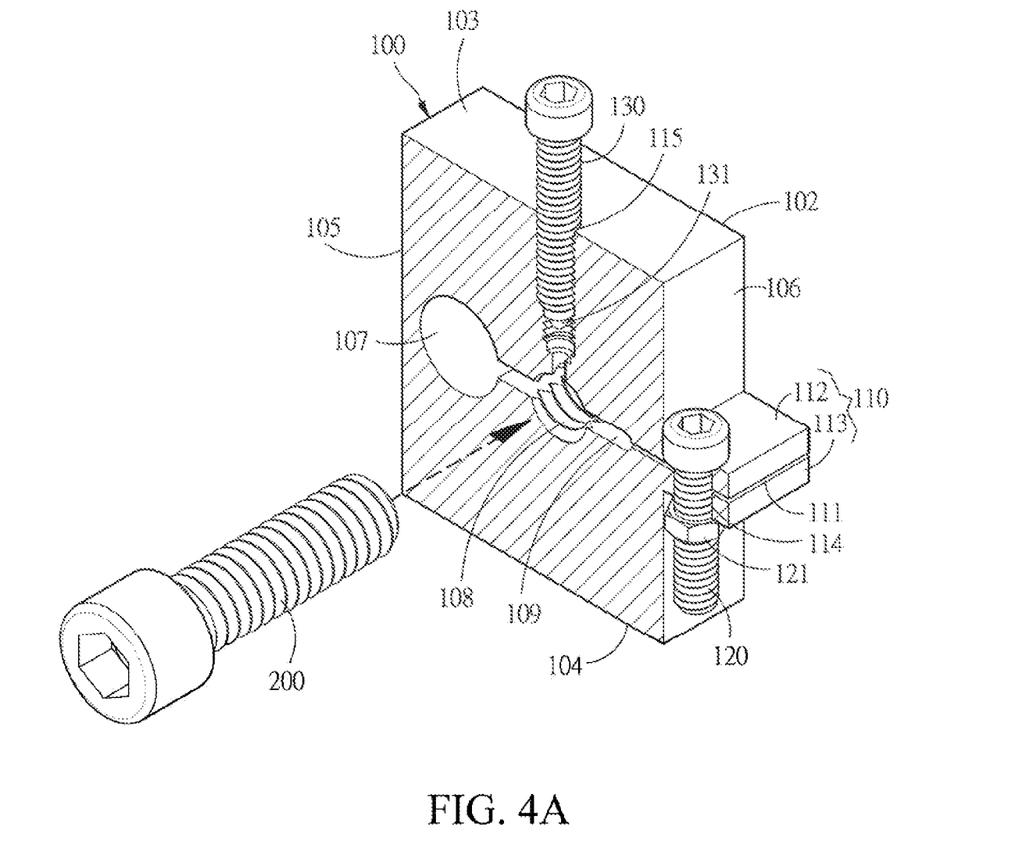
FIG. 4A to FIG. 4D are schematic action diagrams according to embodiments of the present invention.
Figure 4B:
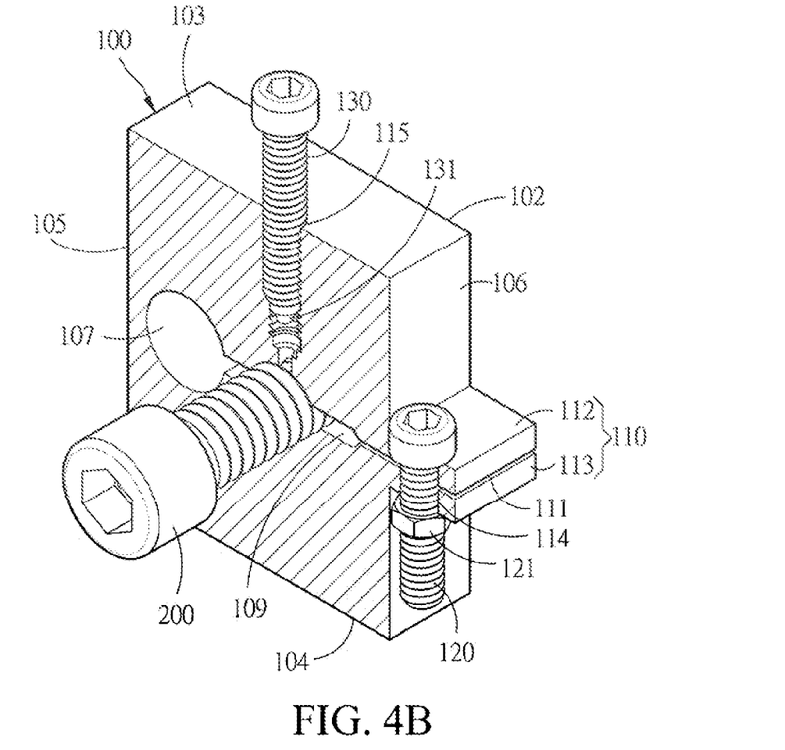
Figure 4C:
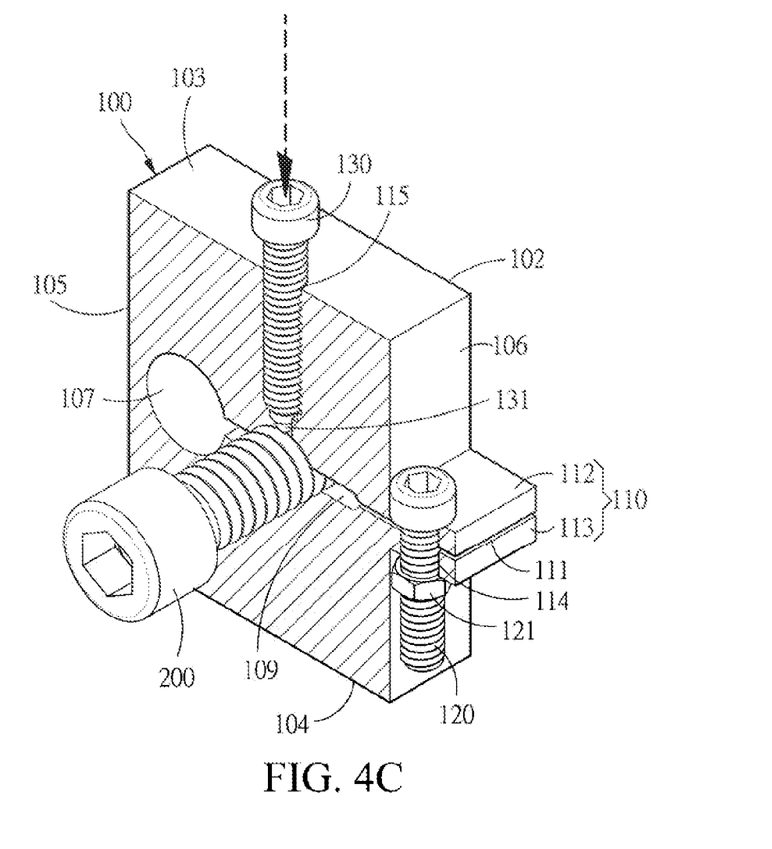
Figure 4D:
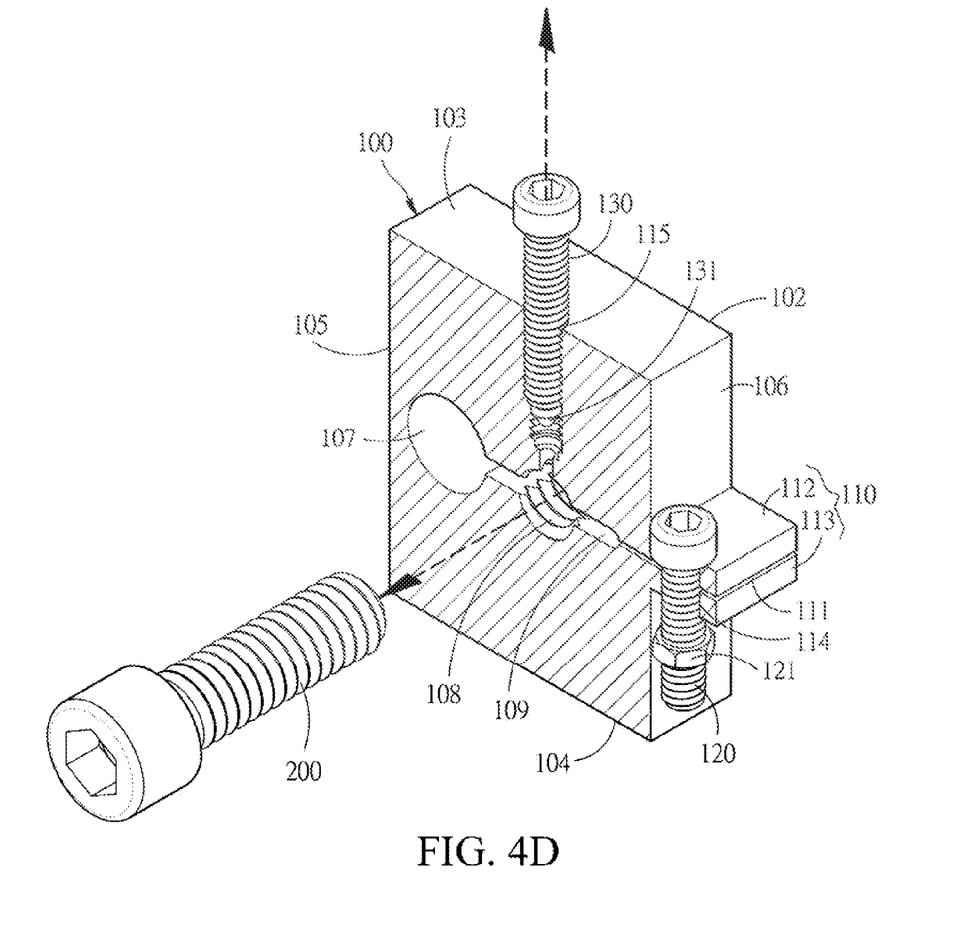
Figure 5:
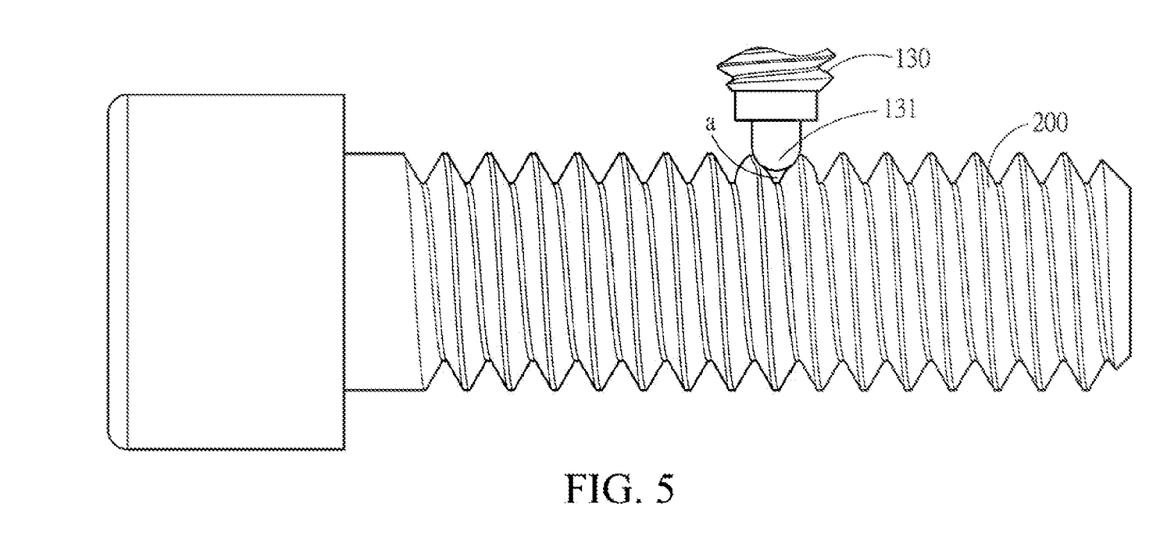
FIG. 5 is a schematic diagram of a packing bolt in contact with a bolt according to the present invention.
Figure 6:
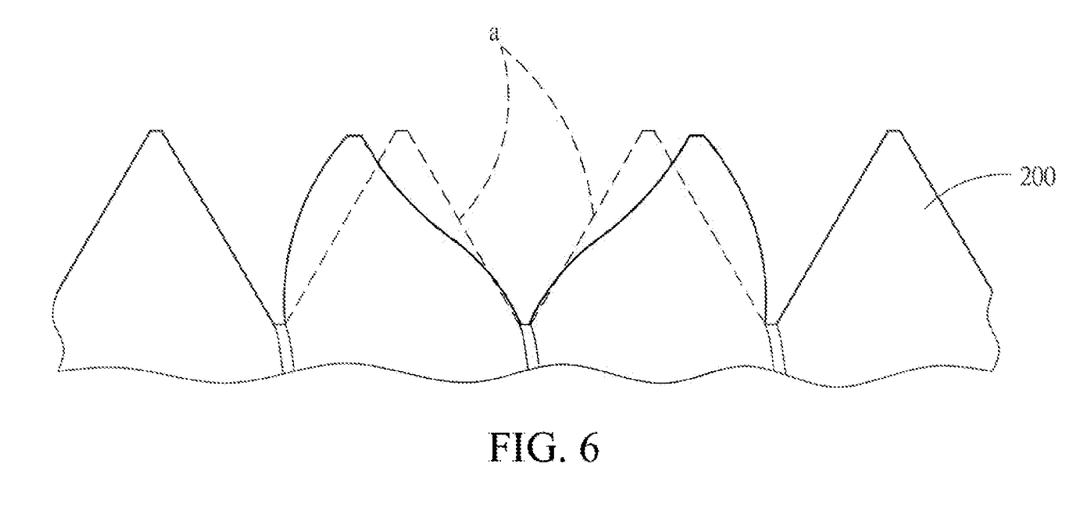
FIG. 6 is a partial enlarged view of a bolt processed according to the present invention.

With reference to the foregoing structure, referring to FIG. 4A to FIG. 4D and FIG. 5, during use, first, the first bolt 120 passes through the penetrating hole 114 of the upper clamping portion 112 and the lower clamping portion 113. Then, the first bolt 120 is screwed with the nut 121, so that the upper clamping portion 112 is connected to the lower clamping portion 113 through the first bolt 120. Then, the packing bolt 130 passes through the second bolt hole 115 and is screwed into the second bolt hole 115. In the following, the first bolt hole 108 may allow a workpiece of a to-be-fastened bolt 200 to be screwed into the first bolt hole 108. The bolt 200 may be screwed into the first bolt hole 108 of the jig body 100 at the selected position a at which the bolt 200 needs to be locked. Then, the packing bolt 130 is rotated, so that the hemispherical suppression portion 131 at the end of the packing bolt 130 is pressed down on the selected position a of the bolt 200, to cause the crest at the selected position a to expand outward as shown in FIG. 5 and FIG. 6. Then, the packing bolt 130 is loosened to move up, to cause the suppression portion 131 of the packing bolt 130 depart from the bolt 200, thereby taking out the processed bolt 200, as shown in FIG. 4D, FIG. 5 and FIG. 6. The crest at the selected position a of the bolt 200 is caused to expand outward, so that interference occurs when the bolt is screwed with a bolt hole or a nut, to improve a locking force, to increase a torque force required to make the bolt 200 come off, thereby preventing the bolt 200 from loosening or withdrawing when the bolt 200 is used in a mechanism having vibration or expanding with heat and contracting with cold.

In the present invention, a hole diameter size of the first bolt hole 108 and a size of the hemispherical suppression portion 131 of the packing bolt 130 are changed, to be applicable to expanding the crests of various bolts 200 with different specifications.

The present invention has at least the following advantages:
1. Crests may be processed to expand outward according to various bolts in the present invention, and a locking bolt can be quickly manufactured, thereby having advantages of being fast, convenient, and easy to use.
2. The present invention is simple in structure, and easy and fast to process and operate, so that costs can be greatly reduced, having the advantage of being easy to obtain.
3. The present invention is small in size, occupies little space, and is convenient to carry, making it easy to be used everywhere, thereby achieving a high price-quality ratio.

The foregoing descriptions are merely preferred embodiments of the present invention and are not intended to limit the scope of implementation of the present invention. Any equivalent change and modification made according to the scope of the present invention and the content of the present invention shall all fall within the scope covered by the present invention.

What is claimed is:

1. A hand tool for bolts fastening, comprising a jig body, wherein a first bolt hole is disposed in the jig body laterally and a second bolt hole is disposed in the jig body longitudinally, an end of the second bolt hole is in communication with the first bolt hole, the second bolt hole allows a packing bolt to pass through and be screwed, a suppression portion is disposed at an end of the packing bolt, the first bolt hole allows a to-be-fastened bolt to be screwed, the suppression portion of the packing bolt is pressed down on a selected position of the bolt, to cause a crest at the selected position to expand outward, so that interference occurs when the bolt is screwed with a bolt hole or a nut, to improve a locking force;

wherein the jig body is block-shaped and comprises a front side face and a rear side face, the first bolt hole runs through the front side face and the rear side face, the second bolt hole runs through the jig body from a top face of the jig body downward to the first bolt hole, and the suppression portion of the packing bolt is hemispherical;

further comprising a through hole in a same direction as the first bolt hole, and a first cutting slot in a same direction as the top face and a bottom face and running through the front side face and the rear side face, wherein the first cutting slot runs through the first bolt hole so that the through hole is in communication with the first bolt hole, and the first cutting slot extends to a lateral side of the first bolt hole away from the through hole.

2. The hand tool for bolts fastening according to claim 1, wherein the through hole is circular, and the through hole runs through the front side face and the rear side face, a hole diameter of the through hole is greater than a hole diameter of the first bolt hole, an extending portion extends outward from a side of the jig body away from the through hole, the extending portion is disposed with a second cutting slot running through the front side face and the rear side face, the second cutting slot extends to the first cutting slot and meets the first cutting slot, an upper- and- lower width of the first cutting slot is greater than an upper-and-lower width of the second cutting slot, the second cutting slot defines an upper clamping portion and a lower clamping portion disconnected up and down by the extending portion, the upper clamping portion and the lower clamping portion are disposed with a penetrating hole penetrating longitudinally, and a first bolt is screwed with a nut after the first bolt is inserted into the upper clamping portion and the lower clamping portion.

3. The hand tool for bolts fastening according to claim 2, wherein an upper-and-lower thickness of the extending portion is less than an upper-and-lower thickness of the jig body.

4. The hand tool for bolts fastening according to claim 2, wherein the jig body is a rectangular block and has the front side face and the rear side face in a front direction and a rear direction respectively, the jig body has the top face and a bottom face in an upper direction and a lower direction respectively, the jig body has a first side face and a second side face on a left side and a right side respectively, the through hole is close to the first side face, the extending portion extends from the second side face, and the first cutting slot extends to a position close to the second side face.

5. The hand tool for bolts fastening according to claim 1, wherein a hole diameter size of the first bolt hole and a size of the suppression portion of the packing bolt can be changed to apply to various bolts with different specifications.

\* \* \* \* \*